United States Patent [19]
Anderson, Jr.

[11] Patent Number: 5,805,674
[45] Date of Patent: Sep. 8, 1998

[54] SECURITY ARRANGEMENT AND METHOD FOR CONTROLLING ACCESS TO A PROTECTED SYSTEM

[76] Inventor: Victor C. Anderson, Jr., 3525 Quimby St., San Diego, Calif. 92106

[21] Appl. No.: 612,679

[22] Filed: Mar. 8, 1996

Related U.S. Application Data

[63] Continuation-in-part of Ser. No. 378,393, Jan. 26, 1995, abandoned.

[51] Int. Cl.$^6$ .................................................. H04M 1/66
[52] U.S. Cl. ...................... 379/93.03; 379/111; 704/270; 704/273
[58] Field of Search ................................. 379/67, 88, 89, 379/91.01, 93.02, 93.03, 93.04, 111, 113, 118, 120, 188, 200, 201, 243, 127, 142; 395/2.1, 2.35, 2.36, 2.37, 2.55, 2.6, 2.79, 2.82; 380/3, 6, 19; 902/5; 704/201, 226, 227, 228, 242, 246, 251, 270, 273

[56] References Cited

U.S. PATENT DOCUMENTS

| | | | |
|---|---|---|---|
| 4,679,236 | 7/1987 | Davies | 380/23 |
| 4,885,762 | 12/1989 | Suzuki et al. | 379/200 |
| 4,998,279 | 3/1991 | Weiss | 380/23 |
| 5,020,105 | 5/1991 | Rosen et al. | 380/23 |
| 5,056,141 | 10/1991 | Dyke | 380/25 |
| 5,101,434 | 3/1992 | King | 380/25 |
| 5,170,426 | 12/1992 | D'Alessio et al. | 379/38 |
| 5,216,720 | 6/1993 | Naik et al. | 395/2.82 |
| 5,274,695 | 12/1993 | Green | 379/86 |
| 5,311,594 | 5/1994 | Penzias | 380/23 |
| 5,345,595 | 9/1994 | Johnson et al. | 455/33.1 |
| 5,414,755 | 5/1995 | Bahler et al. | 455/411 |
| 5,420,908 | 5/1995 | Hodges et al. | 455/411 |
| 5,420,910 | 5/1995 | Rudokas et al. | 455/410 |
| 5,434,918 | 7/1995 | Kung et al. | 380/25 |
| 5,455,863 | 10/1995 | Brown et al. | 380/23 |
| 5,461,665 | 10/1995 | Shur et al. | 379/67 |
| 5,463,681 | 10/1995 | Vaios et al. | 379/189 |
| 5,465,290 | 11/1995 | Hampton et al. | 379/67 |
| 5,465,387 | 11/1995 | Mukherjee | 455/26.1 |
| 5,467,382 | 11/1995 | Schorman | 455/410 |
| 5,467,398 | 11/1995 | Pierce et al. | 380/44 |
| 5,469,497 | 11/1995 | Pierce et al. | 379/115 |
| 5,471,521 | 11/1995 | Minikami et al. | 380/44 |
| 5,481,611 | 1/1996 | Owens et al. | 380/25 |
| 5,499,288 | 3/1996 | Hunt et al. | 379/88 |
| 5,510,777 | 4/1996 | Pilc et al. | 340/825.44 |
| 5,548,647 | 8/1996 | Naik et al. | 380/23 |
| 5,566,234 | 10/1996 | Reed et al. | 379/188 |

*Primary Examiner*—Krista Zele
*Assistant Examiner*—Scott L. Weaver
*Attorney, Agent, or Firm*—Higgs, Fletcher & Mack; Bernard L. Kleinke

[57] ABSTRACT

The security arrangement includes a computer processor unit coupled to a subscriber information memory to verify whether the user is an authorized user. The subscriber information memory stores subscriber voice information and variable security level information. A prompt memory coupled to the computer processor unit requests the user to input a set of verification information determined by the security level information. The input set of verification information is compared with stored subscriber voice information by a voice analyzer coupled to the subscriber information memory, wherein access to the system is enabled when the input set of verification information corresponds substantially with the subscriber voice information.

9 Claims, 8 Drawing Sheets

FIG. 2G

SECURITY ARRANGEMENT AND METHOD FOR CONTROLLING ACCESS TO A PROTECTED SYSTEM

CROSS REFERENCE TO RELATED APPLICATIONS

This application is a continuation-in-part application of U.S. patent application Ser. No. 08/378,393, filed Jan. 26, 1995, now abandoned and entitled "SECURITY ARRANGEMENT AND METHOD FOR CONTROLLING ACCESS TO A PROTECTED SYSTEM," and is incorporated herein by reference.

TECHNICAL FIELD

The present invention relates in general to a security arrangement and method for controlling the access to a protected system, such as a cellular telephone system. The invention more particularly relates to a security arrangement which facilitates the denying of access to the system by an unauthorized user, and which can be used according to a novel method.

BACKGROUND ART

There have been many types and kinds of security arrangements for controlling access to protected systems, including cellular telephone systems. For example, reference may be had to the following U.S. Pat. Nos.: 5,481,611; 5,471,521; 5,467,398; 5,467,382; 5,465,387; 5,465,290; 5,463,681; 5,461,665; 5,455,863; 5,434,918, 5,420,910; 5,420,908; 5,414,755; 5,274,695; 5,216,720; 5,056,141; 5,020,105; 4,998,279; 4,885,762; and 4,679,236, all of which are incorporated by reference as if fully set forth herein.

Inexpensive technological advances have enabled cellular thieves to capture the electronic serial number (ESN) and mobile identification number (MIN) information associated with a cellular telephone, thereby permitting the thieves to easily reproduce the ESN and MIN identification numbers for the associated authorized subscriber in unauthorized telephones. The unauthorized telephones were inexpensive to obtain, and therefore attractive to unauthorized users. Using the unauthorized telephones, the unauthorized users were able to obtain free cellular telephone service at the expense of the authorized subscriber and the cellular telephone service providers.

To combat the loss due to the unauthorized telephones, some cellular telephone service providers required the user to interact with the telephone system to help identify the user as the authorized user. The use of additional identifying information, such as a personal identification number (PIN), a password, or other personal information (PI), to thwart the thieves was attempted. For example, the following U.S. patents disclose access control systems which require the user to supply information to the access control system in an interactive manner: U.S. Pat. Nos. 5,467,382; 5,465,387; 5,463,681; 5,461,665; 5,420,910; 5,056,141; 4,885,762; and 4,679,236, all of which are incorporated by reference as if fully set forth herein.

While the interaction by the user temporarily slowed down the incidence of cellular thievery, the thieves were quick to adapt. It was soon discovered that the information supplied by the user could also be captured relatively easily. Thus, the improved interactive access control systems were defeated without dramatically affecting the cost to unauthorized users for obtaining an unauthorized telephone.

From the foregoing, the beginning of a pattern can be observed wherein the cellular telephone service providers incorporated a security device which functions adequately for a period of time. Subsequently, the cellular thieves discovered the information necessary to breech the security device. Using this information, the thieves adapted unauthorized telephones capable of providing unauthorized access to the services of the cellular telephone service providers. Furthermore, the unauthorized telephones were produced at a relatively low cost, making the price for unauthorized cellular telephone service attractive to an unauthorized user.

Recent security efforts by cellular telephone service providers included authentication techniques utilizing digital telephone technology. Such authentication techniques were described, for example, in a newspaper article "Cellular Carriers Try New Tricks to Beat Bandits," The Wall Street Journal, Mar. 16, 1995, which is incorporated by reference as if fully set forth herein. Examples of these digital authorization techniques are set forth in the following U.S. Pat. Nos.: 5,481,611; 5,467,398; 5,455,863; 5,434,918; 5,420,908; and 5,020,105, all of which are incorporated by reference as if fully set forth herein.

As described therein, encryption methods utilizing secret keys secured the system from unauthorized access. A unique cryptogram was assigned or selected randomly for every cellular telephone unit. A telephone unit attempting to access the protected system was challenged to provide a response corresponding to that particular telephone unit. To prevent the response from being captured, the response was scrambled by the telephone unit and reconstructed by the cellular network. Access to the protected system was enabled only when the proper response was received from the telephone unit.

Although the authentication technique may have deterred unauthorized access, the expense of utilizing the authorization technique by authorized users was generally high. In this regard, existing analog telephone units were required to be replaced with more expensive digital units at the expense of the authorized subscriber.

In addition, the ability of the authorized user to utilize cellular telephone service in more than one market was greatly reduced. For example, an analog cellular service may not be capable of performing the authentication technique. As a result, an authorized user using the digital authentication technique may be excluded from service in the analog service market. Similarly, an analog telephone unit might be denied access in a digital cellular service market.

The use of voice recognition authentication (VRA) was introduced to enable authorized users to access the protected system using a unique identifier of the authorized user, and not a unique identifier of the authorized telephone. For example, reference may be had to the following U.S. Pat. Nos.: 5,471,521; 5,465,290; 5,414,755; 5,274,695; 5,216,720; and 4,998,279, all of which are incorporated by reference as if fully set forth herein.

Although the use of VRA enabled the system to correlate a received voice sample with a stored voice sample to verify that the caller was in fact an authorized subscriber, the cellular thieves could defeat these systems as well. As with the ESN, MIN, PIN, password and PI information, the thieves could easily capture the information for playing back at a later time.

An improved VRA system was disclosed in co-pending U.S. patent application Ser. No. 08/378,393, filed Jan. 26, 1995, and entitled "SECURITY ARRANGEMENT AND METHOD FOR CONTROLLING ACCESS TO A PROTECTED SYSTEM," and which is incorporated by reference as if fully set forth herein. Therein, a security arrangement for limiting access to a cellular telephone system based on stored voice information for an authorized user was described. The user attempting to gain access to the protected cellular system was required to speak a password and a randomly generated alphanumeric code. Access to the system was permitted only where the spoken password and randomly generated code matched the stored voice information.

While the use of the password plus the randomly generated code was satisfactory to substantially reduce unauthorized access to the system, the authorized user was required to input the same amount of identifying information each time that access to the system was attempted. As a result, every attempt by the authorized user to gain access to the protected system was treated as though an unauthorized user was attempting to gain access to the system.

A variable access control system for adjusting the amount of identifying information which must be input by a user was disclosed in U.S. Pat. No. 5,465,387, and is incorporated by reference as if fully set forth herein. The access control system determined whether the present call was a suspicious call, and performed an authentication procedure or challenge upon the detection of a certain number of successive suspicious calls. The frequency of the challenges was variable, wherein the failure of a user to properly respond to a challenge adjusted the frequency.

Although the access control system described in U.S. Pat. No. 5,465,387 was responsive to the detection of suspicious activity, many unauthorized calls could be completed, before and after authentication procedures are interposed. Also, it would be relatively inexpensive for a thief to circumvent the security.

Therefore, it would be highly desirable to have a new and improved security arrangement which requires the user to interact with the system to prevent access by an unauthorized user in such a manner that it would not be entirely cost effective to defeat the security interposed for gaining access to the system. Such a security arrangement should be user friendly.

DISCLOSURE OF INVENTION

Therefore, the principal object of the present invention is to provide a new and improved security arrangement and method, which limits access to a protected system by an authorized user and is difficult to defeat.

A further object of the present invention is to provide a new and improved security arrangement that requires interaction by the user to prevent access to the secured system by an unauthorized user, which security arrangement is user friendly and would be cost prohibitive for use by unauthorized users attempting to defeat the security arrangement.

Briefly, the above and further objects of the present invention are realized by providing a new and improved security arrangement which is difficult to defeat, and involves user interaction.

The security arrangement includes a computer processor unit coupled to a subscriber information memory to verify whether the user is an authorized user. The subscriber information memory stores subscriber voice information and variable security level information. A prompt memory coupled to the computer processor unit requests the user to input a set of verification information determined by the security level information. The input set of verification information is compared with stored subscriber voice information by a voice analyzer coupled to the subscriber information memory, wherein access to the system is enabled when the input set of verification information corresponds substantially with the subscriber voice information.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
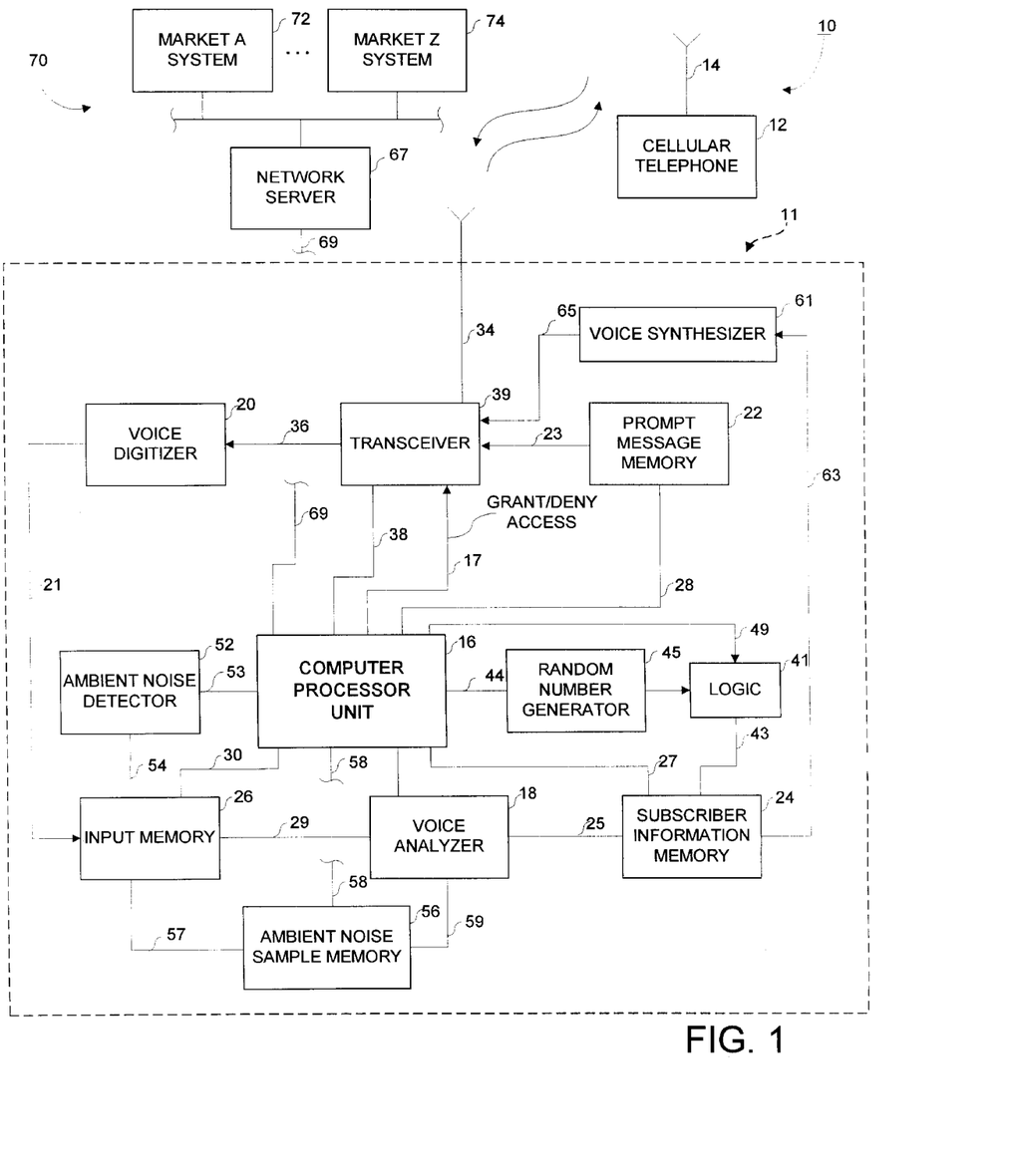
FIG. 1 is a block diagram of the security arrangement of the present invention.

Referring now to the drawings, and more particularly to FIG. 1 thereof, there is shown a security arrangement indicated generally at 10 for controlling access to a cellular telephone system, such as cellular telephone system 11, operated by a cellular telephone service provider, and which security arrangement 10 is constructed in accordance with the present invention. Although the arrangement 10 is shown and described in connection with the cellular telephone system 11, it will become apparent to one skilled in the art that the arrangement 10 may be used for controlling access to a variety of other types of protected systems (not shown), including, but not limited to, remotely accessible data bases and large communication networks such as the Internet.

The security arrangement 10 generally includes a cellular telephone 12 having an antenna 14 for enabling a user (not shown) initiating a call from the cellular telephone 12 to interact with the cellular telephone system 11 via an antenna 34 connected thereto, wherein access to the system 11 is enabled when the user is determined to be an authorized user or subscriber. A network of participating cellular telephone systems 70, including Market A system 72 through Market Z system 74, may be coupled to the cellular telephone system 11 by a network server 67 to increase the number of authorized users which may access the cellular telephone system 11. In this way, the cellular telephone system 11 can access subscriber information maintained in Market A system 72 through Market Z system 74 to permit roaming authorized users of Market A system 72 through Market Z system 74, as well as system 11 authorized users, to access the cellular telephone system 11.

Considering now the cellular telephone system 11 in greater detail with reference to FIG. 1, the cellular telephone system 11 includes a computer processor unit 16 responsive to call information supplied by the telephone 12 for determining if the user is an authorized user. The call information enables the computer processor unit 16 to identify the authorized user, or authorized users, associated with the telephone 12. In this way, the computer processor unit 16 can verify that the user is the authorized user to reduce the ability of a non-authorized user to gain access to the system 11. A grant access signal or a deny access signal is transmitted by the computer processing unit 16 via an output lead 17, according to whether the user is determined to be the authorized user or a non-authorized user, respectively, to control access to the system 11.

A subscriber information memory 24 connected to the computer processor unit 16 by cable 27 stores subscriber information for the authorized user, including subscriber call history information, a set of subscriber voice authentication information and variable subscriber security level information, to facilitate verifying that the user is the authorized user. The subscriber voice authentication information is input directly into the system 11 by the authorized user, preferably at the time that the account for the authorized user is set up with the cellular telephone service provider. Modifications to the subscriber voice authentication information may be made by the authorized user under certain conditions from time to time as required.

The subscriber call history information includes, for example, information regarding the time, quantity, frequency, location of call source, and location of call destination for previous calls made by the authorized user. The set of subscriber voice authentication information is indicative of voice recognition authentication (VRA) information and includes, for example, a personal identification code such as a password, a group of security phrases, and personal identification (PI) or personal data information.

The variable subscriber security level information is indicative of the relative probability that fraudulent activity exists. For example, a security level of one may indicate that the probability of fraudulent activity is non-existent or extremely low while a security level of six may indicate that the probability of fraudulent activity is very high. The subscriber security level information may be adjusted to reflect any changes in the probability that fraudulent activity exists. It will be understood by one skilled in the art that other security level magnitudes may be utilized to indicate the probability of fraudulent activity.

A prompt message memory 22 connected to the computer processor unit 16 by cable 28 stores predetermined digitized voice prompt information for prompting the user to input a set of voice verification information corresponding to at least a subset of the subscriber voice authentication information. For example, the user may be prompted to input information corresponding to the subset of subscriber voice authentication information previously stored by the authorized user, including, the password, some or all of the security phrases, or the personal information, alone or in combination with one another. The digitized voice prompt information is transmitted via cable 23, and the composition of the voice prompt information is determined by the computer processor unit 16 according to the subscriber security level information.

In order to analyze the set of voice verification information input by the user in response to the voice prompt information, a voice analyzer 18 is connected to the subscriber information memory 24 by a cable 25 and also to the computer processor unit 16 by cable 19. The voice analyzer 18 compares the set of voice verification information input by the user with the previously stored subset of subscriber voice authentication information to verify that the user is the authorized user when the input voice verification information corresponds substantially with the subset of subscriber voice authentication information.

In operation, call information, including ESN and MIN information and the destination telephone number, is transmitted by the cellular telephone 12 to the cellular telephone system 11 for establishing a communication link between the telephone 12 and the system 11. The call information is utilized by the computer processor unit 16 to identify the authorized user or users associated with the cellular telephone 12.

Subscriber information for the authorized user, including the set of subscriber voice authentication information and variable security level information, is stored in the subscriber information memory 24 for comparison purposes.

Utilizing the security level information, the set of voice verification information to be input by the user is determined the computer processor unit 16, wherein the set of voice verification information corresponds substantially to at least the subset of subscriber voice authentication information.

As an example, a low security level could cause the subset of subscriber voice authentication information to include only the password, thereby requiring the user to input only a password. A medium security level might increase the subset of subscriber voice authentication information to include a password and one or more security phrases, thereby requiring the user to input a password and repeat one or more security phrases. Higher security levels might increase the subset of subscriber voice authentication information to include a password, one or more security phrases, and personal identification information, thereby requiring the user to input a password, repeat one or more security phrases, and input personal identification information such as a mother's maiden name, a social security number, a birthday, etc.

To prompt the user to input the set of voice verification information, the prompt message memory 22 causes digitized voice prompt information to be transmitted to the user. For the security level examples given above, the prompt might be "Please say your password" for the low security level, "Please say your password and repeat the following phrases" for the medium security level, and "Please say your password, repeat the following phrases, and say your birthday" for the high security level.

The set of voice verification information input by the user in response to the prompt is compared by the voice analyzer 18 with the stored subset of subscriber voice authentication information to verify that the user is the authorized user. Should the set of voice verification information input by the user corresponds substantially to the subset of subscriber voice authentication information, the computer processor unit 16 enables the user to access the system 11.

Considering the operation of the computer processor unit 16 in greater detail, the unit 16 is responsive to the call information and the subscriber call history information for detecting indicators of potential fraudulent activity. Examples of potential fraudulent activity indicators include, but are not limited to: two or more concurrent telephone calls associated with the same cellular telephone; the destination telephone number is identified as being call blocked; the destination telephone number is suspected to be involved in fraudulent activity; the user matched only a portion of the subset of subscriber voice authentication information during a previous attempt to gain access; a spatial anomaly between the present and the previous telephone call from the same cellular telephone exists; the call frequency for the authorized subscriber has been exceeded; the average call length for previous telephone calls exceeds a threshold value; the telephone call was placed during a low use or no use time for the authorized subscriber; the telephone call qualifies as a roaming call; the destination telephone number is an international number; the destination telephone number represents a long distance call; or any other activity or event that a cellular telephone service provider may consider to be an indicator of potential fraudulent activity.

The computer processor unit 16 causes the security level information to be adjusted in response to the detection of the indicators of fraudulent activity. In this regard, the security level associated with the authorized user can be increased if an indicator of fraudulent activity, such as a spatial anomaly, is detected. The magnitude of the adjustment can be selected by a cellular telephone service provider as desired. In addition, the duration of the security level information adjustment can be selected.

The set of verification information to be input by the user is determined by the computer processor unit 16, wherein the set of verification information is commensurate with the security level information. Thus, the higher the security level the more verification information must be provided by the user to ensure the user is the authorized user. As the set of verification information to be input corresponds to the subset of subscriber voice authentication information stored in the subscriber information memory 24, increasing the security level also increases the size of the subset of subscriber voice authentication information which must match the set of verification information supplied by the user.

The following Table 1 illustrates the correspondence between the security level and the verification information for an exemplary security arrangement:

TABLE 1

| Security Level | Verification Information |
|---|---|
| 1 | Password |
| 2 | Password and one phrase |
| 3 | Password and two phrases |
| 4 | Password and three phrases |
| 5 | Password, three phrases and personal information |

It will be understood by one skilled in the art that other combinations of verification information may be utilized with satisfactory results.

The system 11 further includes an input memory 26 connected to the computer processor unit 16 by a cable 30 and connected to the voice analyzer 18 by a cable 29 for temporarily storing the set of verification information input by the user. To convert the verification information received into digital information, a voice digitizer 20 is connected to the input memory 26 by a cable 21.

A transceiver 32 is connected to the antenna 34 for receiving the call information from the telephone 12. The call information is communicated to the voice digitizer 20 via cable 36. To receive subscriber identifying information and to control the access to the system 11, the computer processor unit 16 is coupled to the transceiver 32 by cables 38 and 17, respectively, wherein the computer processor unit 16 transmits a grant access signal via cable 17 when the set of verified information input by the user matches substantially the subset of subscriber voice authentication information. However, the computer processor unit 16 transmits a deny access signal via cable 17 when the set of verified information input by the user does not match substantially the subset of subscriber voice authentication information.

In order to enhance the secure nature of the protected system 11, a random number generator 45 is connected to the computer processing unit 16 by cable 44 to facilitate the random selection of the security phrases stored as subscriber voice authentication information. In this regard, a group of security phrases may be initially input by the authorized user for subsequent comparison purposes. The security phrases may comprise words, numbers, combinations of words and numbers, or any other phrase suitable for distinguishing the voice characteristics of the authorized user.

To increase the difficulty of capturing the phrases by cellular thieves, a randomly selected subset of the entire group of stored phrases is utilized. In this way, the phrase or phrases used during one attempt to access the system 11 will likely be different than the phrase or phrases required on another attempt.

A logic circuit 41 connected to the computer processor unit 16 and to the random number generator 45 by cables 49 and 47, respectively, enables the memory addresses corresponding to the randomly chosen subset of phrases to be read out and transmitted to the user. As the phrases were stored directly from the authorized user, a voice print modification device or voice synthesizer 61 is connected between the subscriber information memory 24 and the transceiver 32 by cables 63 and 65, respectively, to transform or alter the verification information before it is transmitted to the telephone 12. In this way, the capturing of voice information indicative of the phrase as stored by the authorized user is substantially prevented.

To compensate for background noises that could affect the performance of the analyzer 18, the system 11 further includes an ambient noise detector 52 connected to the computer processor unit 16 and the input memory 26 by cables 53 and 54, respectively. The ambient noise detector 52 determines whether an ambient noise sample from the vicinity of the user should be used in conjunction with the stored subscriber voice authentication information to correct for discrepancies in the verification information input by the user.

An ambient noise sample memory 56 connected to the computer processor unit 16 by cable 58, and connected between the input memory 26 and the voice analyzer 18 by cables 57 and 59, respectively, temporarily stores a sample of the ambient noise when required. The ambient noise sample is superimposed temporarily over the subset of subscriber voice authentication information for comparing the resulting combination with the input set of verification information.

The network server 67 is connected to the computer processor unit 16 by cable 69 to increase the amount of subscriber information available to the system 11. In this regard, information regarding authorized subscribers from participating cellular telephone systems, such as Market A system 72 through Market Z system 74, can be accessed by the system 11 via the network server 67. Upon receipt of calling information indicative of a telephone that is not enrolled in the system 11, the computer processor unit 16 requests the network server to locate and transfer the subscriber information associated with the telephone from the participating cellular telephone system where the authorized user associated with the telephone is enrolled.

Referring now to FIG. 2A–2G, there is shown a flow chart 100 illustrating the operation of the cellular telephone system 11. The system 11 enables a cellular telephone service provider to provide its authorized users with an option to enroll in a security program utilizing the security arrangement 10. Those authorized users that do not enroll in the security program may still be able to access the system 11, although at a higher risk of being the target of cellular fraud.

Enrolled authorized users are requested to input subscriber voice authentication information, including a password, a group of security phrases and personal identification information, at the time of their enrollment. However, the subscriber voice authentication information may be input, or even updated, at a later time if desired. The subscriber voice authentication information is spoken by the authorized user, preferably with a minimal amount of ambient noise in the background.

Where more than one authorized user is associated with a particular enrolled cellular telephone, the subscriber voice authentication information for each of the authorized users must also be input. In this way, access to the system 11 is possible for more than one authorized user associated with a particular cellular telephone.

Other cellular telephone service providers may cooperate with the system 11 to enable the subscribers of the other providers to obtain the benefit of the security arrangement 10 when travelling to distant service areas. In this regard, the participating providers can make the subscriber voice authentication information for its subscribers enrolled in the security program available to other providers. Thus, when a subscriber from a another service area attempts to make a call through system 11, the subscriber voice authentication information for the travelling subscriber can be accessed for use by the system 11 to determine if access should be granted or denied.

Figure 2A:
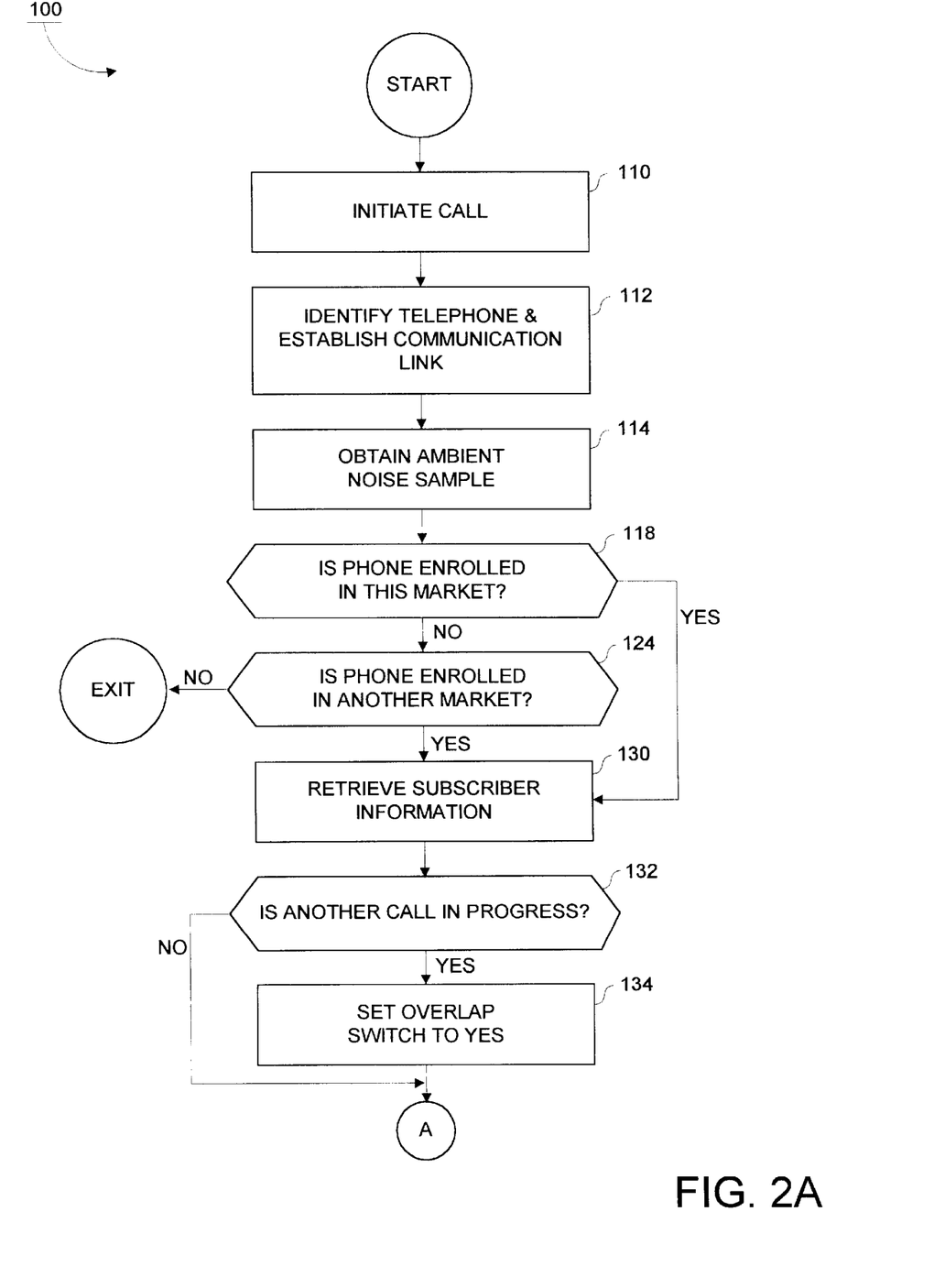
FIG. 2A–2G is a flow chart illustrating the operation of the security arrangement of FIG. 1.

Considering now the operational flow chart 100 for the system 11 in greater detail with reference to FIG. 2A–2G, the operation of the system 11 begins when the user initiates a call with the cellular telephone 12 (FIG. 1) at box 110 (FIG. 2A). The system 11 identifies the calling telephone 12 at box 112 according to call information transmitted by the telephone 12, including the ESN and MIN information, and establishes a communication link therewith according to standard cellular telephone service procedures.

Although the system 11 is preferably controlled by software in the manner set forth in flow chart 100, it will be understood by one skilled in the art that the same process can be produced by hardware. The required hardware would be apparent to one skilled in the art, and will not be described in greater detail herein.

Upon establishing the communication link, ambient noise information is obtained at box 114 before reaching decision box 118. A determination is made at decision box 118 regarding whether the calling cellular telephone is enrolled in the security program of system 11. If the telephone is enrolled, the subscriber information, including the subscriber call history information, the subscriber voice authentication information and the security level information, for the authorized user is retrieved at box 130. As described previously, the subscriber voice authentication information includes a password, security phrases, and personal identification information for the authorized user.

The security level information is indicative of the probability that fraudulent activity exists. The security level information is represented by security levels starting at one and continuing upwardly. Using the example of Table 1, the highest security level is five. As a result, the maximum effective security level is five, and a net security level above five would be treated as a security level of five only. However, other sets of stored subscriber voice authentication information are contemplated, and the maximum security level could vary accordingly.

Where the telephone is not enrolled in system 11, a determination is made at decision box 124 regarding whether the calling cellular telephone is enrolled in the security program of another system. If the telephone is not enrolled in another system, control of the call by the system 11 is terminated. However, if the telephone is enrolled in another system, the subscriber information is retrieved from the other system at box 130.

Figure 2B:
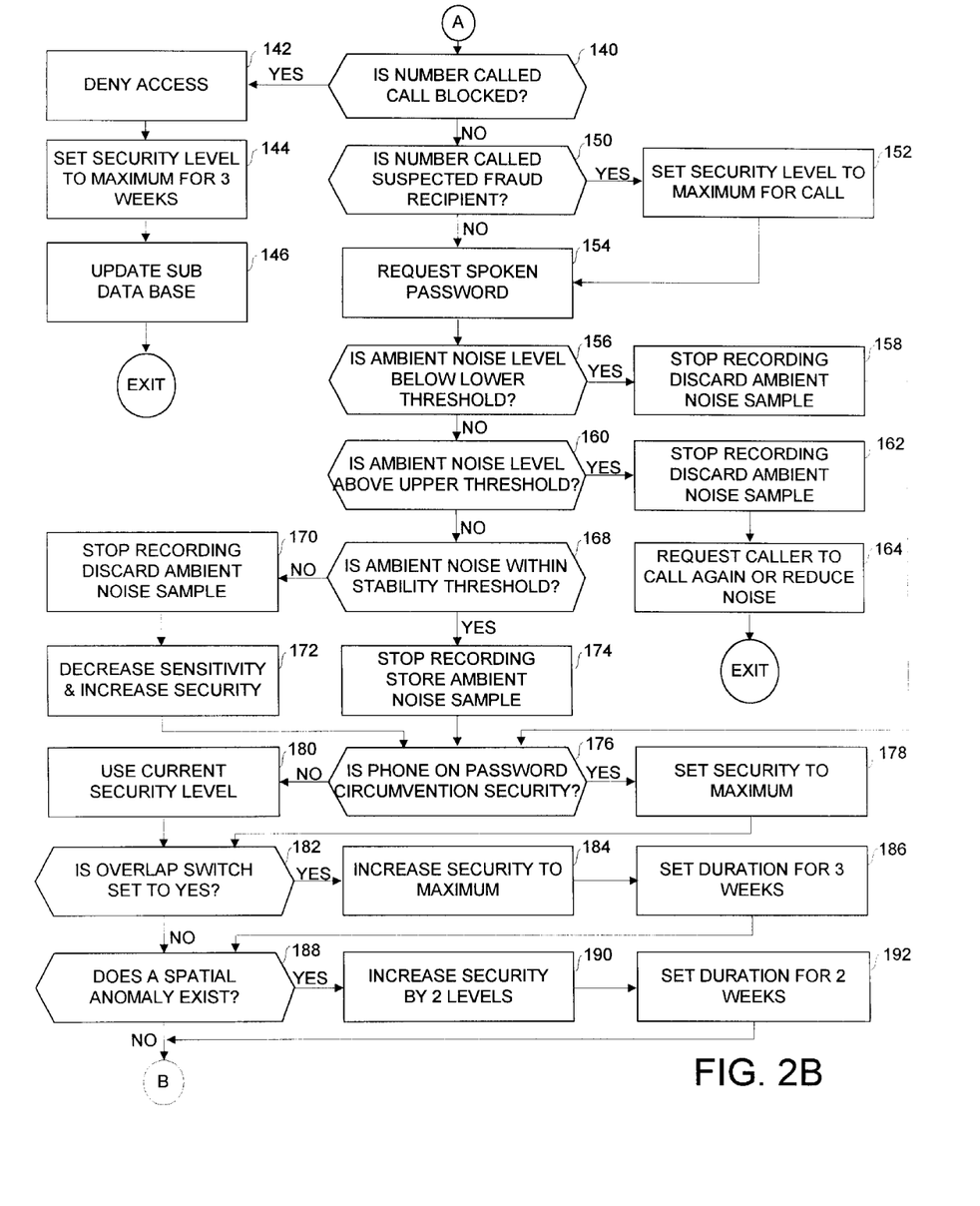

The call information is utilized at decision box 132 to determine if another call associated with the same telephone is presently in progress. If no other call is detected, the destination telephone number is checked at decision box 140 (FIG. 2B) to determine if the destination telephone number has been identified as being call blocked. If another call is in progress, an overlap switch is set to yes at box 134 before making the decision at decision box 140.

Where the destination telephone number is determined to be call blocked, access to the system 11 is denied at box 142. The security level for the authorized user is adjusted to a maximum level for a period of three weeks at box 144. The subscriber information for the authorized user is then updated and stored for future use at box 146 before control of the call is terminated.

It will be understood by one skilled in the art that the particular security level adjustment, and the duration of the adjusted security level, may be selected by each cellular telephone service provider according to their particular preference. Furthermore, the maximum security level may also be selected by each cellular telephone service provider. Thus, the amount of verification information that a user must provide to gain access to the system 11 may vary according to the particular cellular telephone service provider involved.

A determination at decision box 140 that the destination number is not call blocked causes the control of the call to be directed to decision box 150, where the destination number is checked to determine if it is identified as a telephone number suspected of being used in fraudulent telephone activity. Where the destination number is not suspected, the system 11 prompts the user to input the authorized user's password at box 154. If the destination number is suspected, the authorized user security level is set to maximum at box 152 before the password is requested at box 154.

After requesting the password at box 154, the ambient noise sample obtained at box 114 is compared to a lower threshold at decision box 156. If the sample is below the lower threshold, indicating that the sample is not loud enough to affect the voice recognition authentication process of the system 11, the recording of the sample is terminated and the sample is disregarded at box 158 before a determination is made at decision box 176 as to whether the telephone has been placed on password circumvention status.

Password circumvention status relates to a previous call wherein the password supplied by the user matched the stored password voice information for the authorized user but that the security phrase or phrases, or personal identification information, supplied did not match the corresponding stored subscriber voice authentication information.

A determination at decision box 156 that the sample is above the lower threshold leads to decision box 160 to determine whether the sample is above an upper threshold, indicating that the sample is to loud for accurately using the voice recognition authentication process. If the sample is above the upper threshold, the recording of the sample is terminated and the sample is disregarded at box 162. The caller is then requested at box 164 to attempt the call again before terminating the control of the call.

Where it is determined at decision box 160 that the sample is below the upper threshold, a determination regarding the stability of the sample is made at decision box 168. The stability of the sample refers to the constancy of the sample, or the relative absence of abrupt changes in the sample. If the sample is determined to be within the stability threshold required for desired accuracy in the voice recognition authentication process, the recording of the sample is terminated and the sample is stored at box 174. After storing the sample, the determination regarding the password circumvention status is made at decision box 176.

A determination at decision box 168 that the sample is not within the stability threshold causes the recording of the sample to end, wherein the sample is disregarded, at box 170. The sensitivity of the ambient noise monitoring is decreased at box 172. To counter balance the reduced sensitivity, the security level for the authorized user is increased at box 172, before the password circumvention status of the telephone is checked at decision box 176.

Where it is determined at box 176 that the telephone is on password circumvention status, the security level is adjusted to maximum at box 178 before a determination is made at decision box 182 regarding the status of the overlap switch. If the telephone is not on password circumvention status, the present security level is maintained as indicated at box 180.

Using either the current security level from box 180 or the maximum security level from box 178, decision box 182 checks the overlap switch to ascertain if two simultaneous calls were detected. Where the overlap switch was set to yes, the security level is adjusted to a maximum level at box 184 and the duration of the adjusted security level is set for three weeks at box 186 before a determination regarding a spatial anomaly is made at decision box 188. If the overlap switch is not set to yes at decision box 182, the program proceeds directly to decision box 188.

The detection of a spatial anomaly at decision box 188 relates to the occurrence of two calls made from two geographically different locations within a period of time which is shorter than present travel options would dictate. Such detection processes are well known, and will not be described in greater detail herein.

Figure 2C:
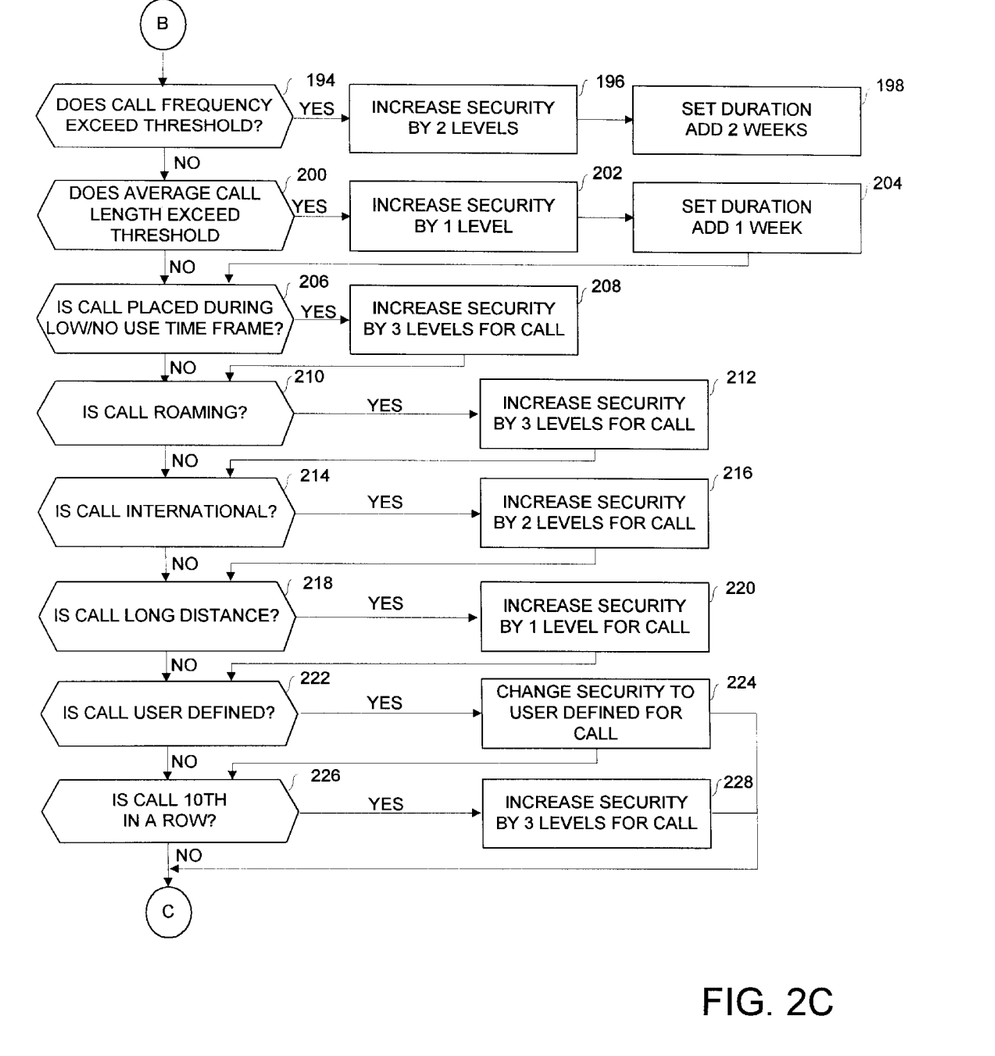

When a spatial anomaly is detected at decision box 188, the security level is increased at box 190 by two levels and the duration of the adjusted security level is set for two weeks, before proceeding to decision box 194 (FIG. 2C). The failure to detect a spatial anomaly leads directly to decision box 194, wherein the subscriber information for the authorized user is utilized to determine if the call frequency by the telephone exceeds a designated threshold.

A determination that the frequency threshold has been exceeded at box 194 results in the security level being increased by two levels for a period of two weeks. The average length of the call is compared to a designated threshold at decision box 200 after the security level has been adjusted, and its duration set at box 198. Where the frequency does not exceed the threshold, the operation continues directly to decision box 200.

The average call length information contained within the subscriber information for the authorized user is checked to determine if the average call length exceeds the designated threshold at box 200. A determination that the average call length does exceed the threshold causes the security level to be increased by one at box 202, and the duration of the adjusted security level is set to last one week at box 204, before comparing the time of the call with call history information at decision box 206. If the average call length does not exceed the threshold, the determination at decision box 206 is made next.

The determination at decision box 206 is made to determine if the call is being placed at a typical low or no use time for the authorized user. Where the call is placed during such low or no use times, the security level is increased by three levels at box 209 for the duration of the present call only. If the call is not within the low or no use times, or after the security level is adjusted at box 209, a determination is made at decision box 210 regarding whether the call is a roaming call.

A determination at box 210 that the call is roaming causes the security level to be increased at box 212 by three levels for the duration of the call, before a determination is made at decision box 214 regarding whether the destination number is indicative of an international call. If it is determined that the call is not a roaming call, the operation proceeds to box 214 without adjusting the security level.

A determination at decision box 214 that the call is an international call results in the security level being increased by two levels for the duration of the call at box 216. The operation continues to decision box 218 from either decision box 214 if the call is not an international call, or from box 216, to determine if the destination number is indicative of a long distance call.

A determination at box 218 that the call is a long distance call causes the security level to be increased by one level at box 220 for the duration of the call, before a determination is made at decision box 222. If it is determined that the call is not a long distance call, the operation proceeds to box 222 without adjusting the security level.

The contents of decision box 222 are defined by the authorized user to accommodate the varying needs of the authorized user. In this regard, the authorized user may use box 222 to define any number of instructions regarding the desired security level for any particular call. As an example, the authorized user may use box 222 to circumvent the VRA of system 11 when the authorized user permits a non-authorized user to make a call. Similarly, the authorized user may vary the change in security level at box 224 as desired. From either box 222 or box 224, the operation continues to decision box 226 regarding the number of calls made previous to the present call.

To increase the ability of the system 11 to detect when a non-authorized user is attempting to gain access, every tenth call made from the telephone causes the security level to be adjusted for the duration of the call. The detection of the tenth call is indicated at decision box 226, and the increase in the security level by three levels is performed at box 228. In this way, a user will be required to provide verification information commensurate with the adjusted security level at least once within ten consecutive calls made.

Thus, if a non-authorized user is somehow able to gain access under a relatively low security level, the non-authorized user will be challenged at a higher security level at least once within ten consecutive calls. The choice of ten consecutive calls is preferred.

However, the determination of the number of consecutive calls is up to the discretion of the particular cellular provider. The operation continues to decision box 230 (FIG. 2D) from either box 226 or 228 to help determine the amount of verification information that must be provided by the user.

Figure 2D:
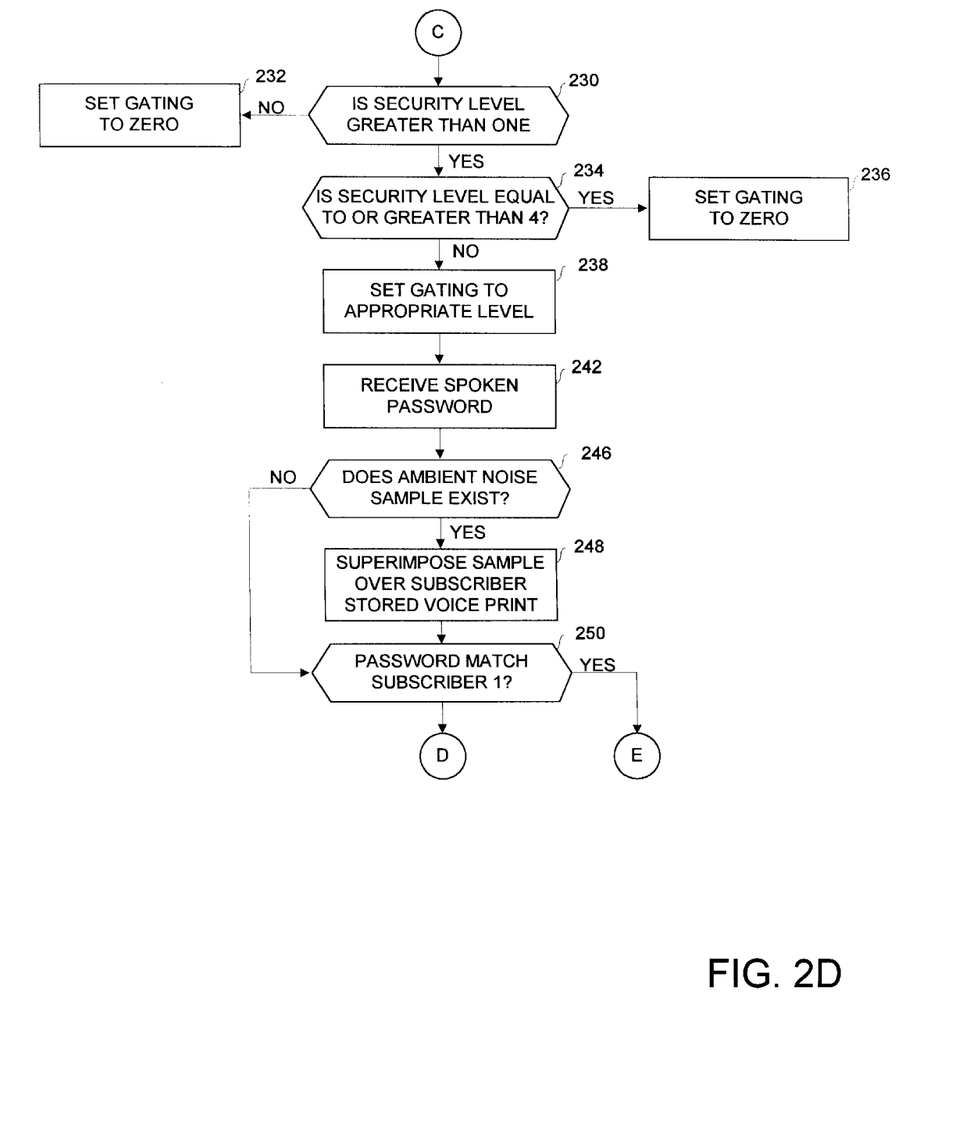

The security level to this point in the telephone call is compared at decision box 230 with the security level required for the user to input only a password as the verification information. As set forth in Table 1 previously, a security level of one will require the user to input only a password. A security level above a one will require the user to input more than just a password. Thus, if the security level is one, a gating code indicative of the number of security phrases that the user must provide is set to zero at box 232.

Where the security level is greater than one, a determination is then made at decision box 234 regarding the security level being greater than four. In the present example, it is contemplated that the maximum number of security phrases that the user must provide, in addition to the password, is three. Thus, a security level greater than four indicates the user must, at the very least, provide the password and three security phrases.

From the example of Table 1, a security level of two, three or four will require the user to provide one, two or three security phrases, respectively, selected at random from a group of stored security phrases. Where the security level is less than four, the appropriate number of security phrases required is identified at box 238, and the gating code identified accordingly. If the security level is greater than four, the gating code is set to three at box 236 to indicate that the maximum number of security phrases, three, will be required.

After the gating code is set at box 232, box 236 or box 238, the system 11 receives and stores the password input by the user at box 242 for comparison purposes. The existence of an ambient noise sample is then determined at box 246. If an ambient noise sample was stored, the sample is superimposed over the stored subscriber voice authentication information indicative of the stored password at box 248.

From either box 246 or box 248, the subsequent step requires that the password supplied by the user as verification information be compared to the stored password information. As many authorized users can be associated with a telephone, the subscriber information for each authorized user may need to be compared with the password provided.

Figure 2E:
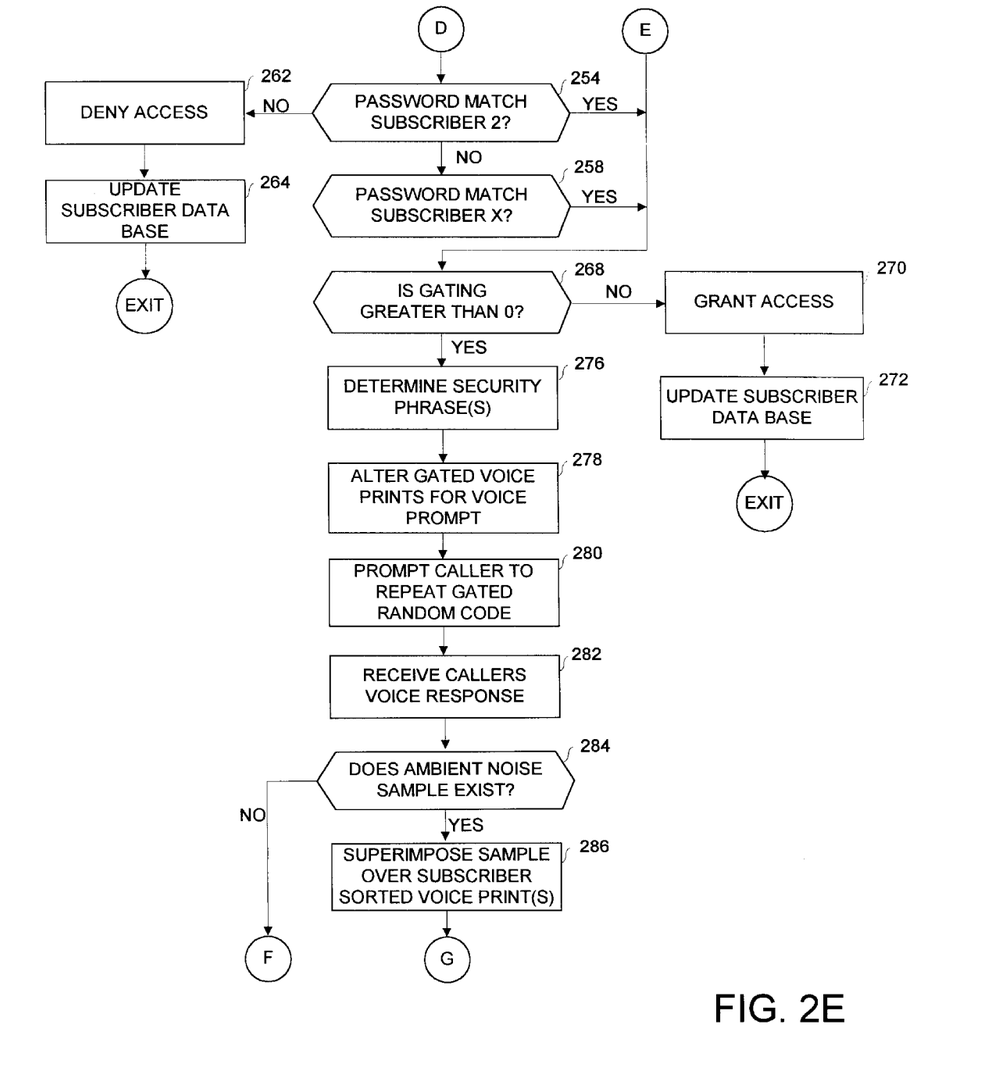

At box 250, the input password is compared with the subscriber voice authentication information for the first authorized user associated with the telephone. If the input password matches the stored password for the first authorized user, the status of the gating code is checked at decision box 268 (FIG. 2E). Should the input password not match the stored password for the first authorized user, the input password is compared with the stored password for the second authorized user at decision box 254 (FIG. 2E).

Where no match is determined at decision box 254, the input password can be compared with additional authorized users associated with the telephone as indicated by decision box 258. The failure to match the input password with the stored information of any of the authorized users causes the system 11 to deny access to the user at box 262. The authorized user information is then updated at box 264 before the operation is terminated.

In the event that a match is determined at either box 250 (FIG. 2D), 254 or 258, the status of the gating code is checked at decision box 268. A gating code of zero indicates that the user was only required to input a password. As the input password matched the stored subscriber voice authentication information, access to the system 11 is granted at box 270. The subscriber information is the updated at box 272 before the operation is terminated.

Where the gating code is greater than zero, additional information in the form of one or more security phrases must also be input. Thus, if the gating code is determined to be greater than zero at box 268, the appropriate security phrase or phrases are selected at box 276. As discussed previously, the subset of security phrases to be used are selected randomly from a larger set of stored security phrases.

The security phrase or phrases are altered at box 278 to prevent a non-authorized user from capturing the phrases. The user is then prompted at box 280 to repeat the security phrase or phrases.

Figure 2F:
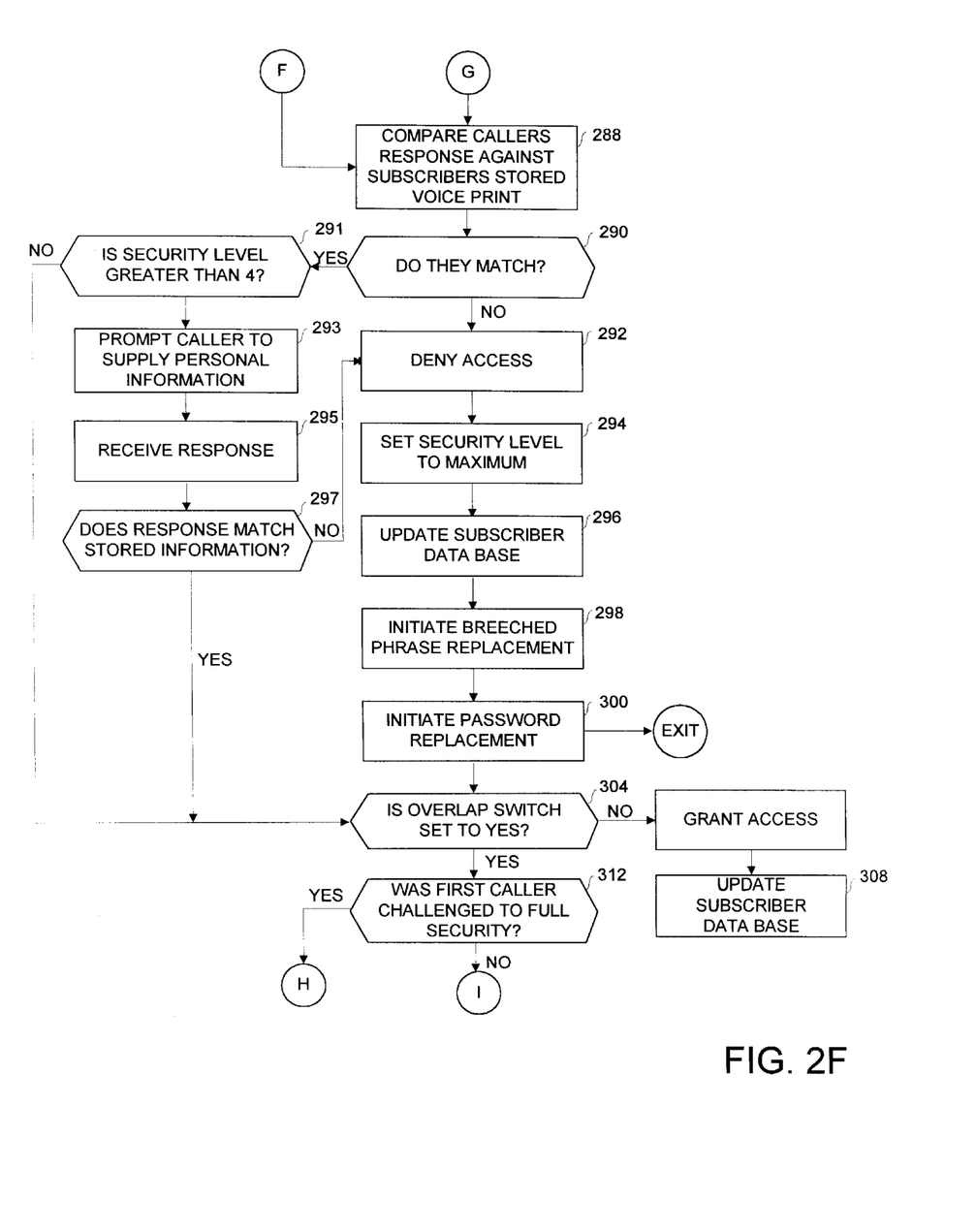

The verification information containing the user's response to the prompt to input the security phrase or phrases is received at box 282. At decision box 284 a determination is made regarding the existence of an ambient noise sample. If such a sample was stored, it is superimposed over the verification information received from the user at box 286 for comparison at box 288 (FIG. 2F). If no sample was stored, the operation proceeds directly to box 288 from box 284.

A determination is made at decision box 290 (FIG. 2F) regarding whether the verification information input by the user matches substantially the stored subscriber voice authentication information corresponding to the security phrases. Should the verification information not match the stored subscriber voice authentication information, access to the system 11 is denied at box 292 and the security level is set to maximum at box 294 before the subscriber information is updated at box 296.

The failure to determine a match at decision box 290 indicates that the user may have matched the password and one or more, but not all, of the security phrases. As a result, the likelihood that a non-authorized user has captured the password and one or more, but not all, of the security phrases is greatly increased. As a result, a process to have the authorized user replace the security phrases is initiated at box 298 and a process to have the authorized user replace the password is initiated at box 300 before the operation is terminated.

The determination of a match at decision box 290 leads to decision box 291 where the security level is checked to determine if further verification information must be input by the user. If the security level is not greater than four, all of the required verification information commensurate with the security level has been input, and the program proceeds to decision box 304. However, if the security level exceeds four, additional verification information is required and the operation proceeds to box 293.

The user is prompted at box 293 to input personal identification information such as a birth date for additional verification information. The input personal identification information is received and stored at box 295.

The input personal identification information is compared at box 297 with the subscriber voice authentication information for a match. The determination at box 297 that the input personal identification information does not match the corresponding stored personal identification information causes the program to proceed to box 292 where access to the system 11 is denied. In the event that a match is determined, the program proceeds to decision box 304 to determine if the overlap switch was set to yes, indicating that further challenges are required.

It will be understood by one skilled in the art that the personal identification information could be requested by a live operator and compared thereby with stored subscriber information, wherein the comparison is performed by the operator instead of by a digital voice analyzer.

Where the overlap switch is not set to yes, access to the system 11 is granted at box 306 and the subscriber information is updated at box 308 before the program is terminated. If the overlap switch is set to yes, a determination is made at decision box 312 as to whether the first caller, who is not the present user, was challenged at a maximum security level.

Figure 2G:
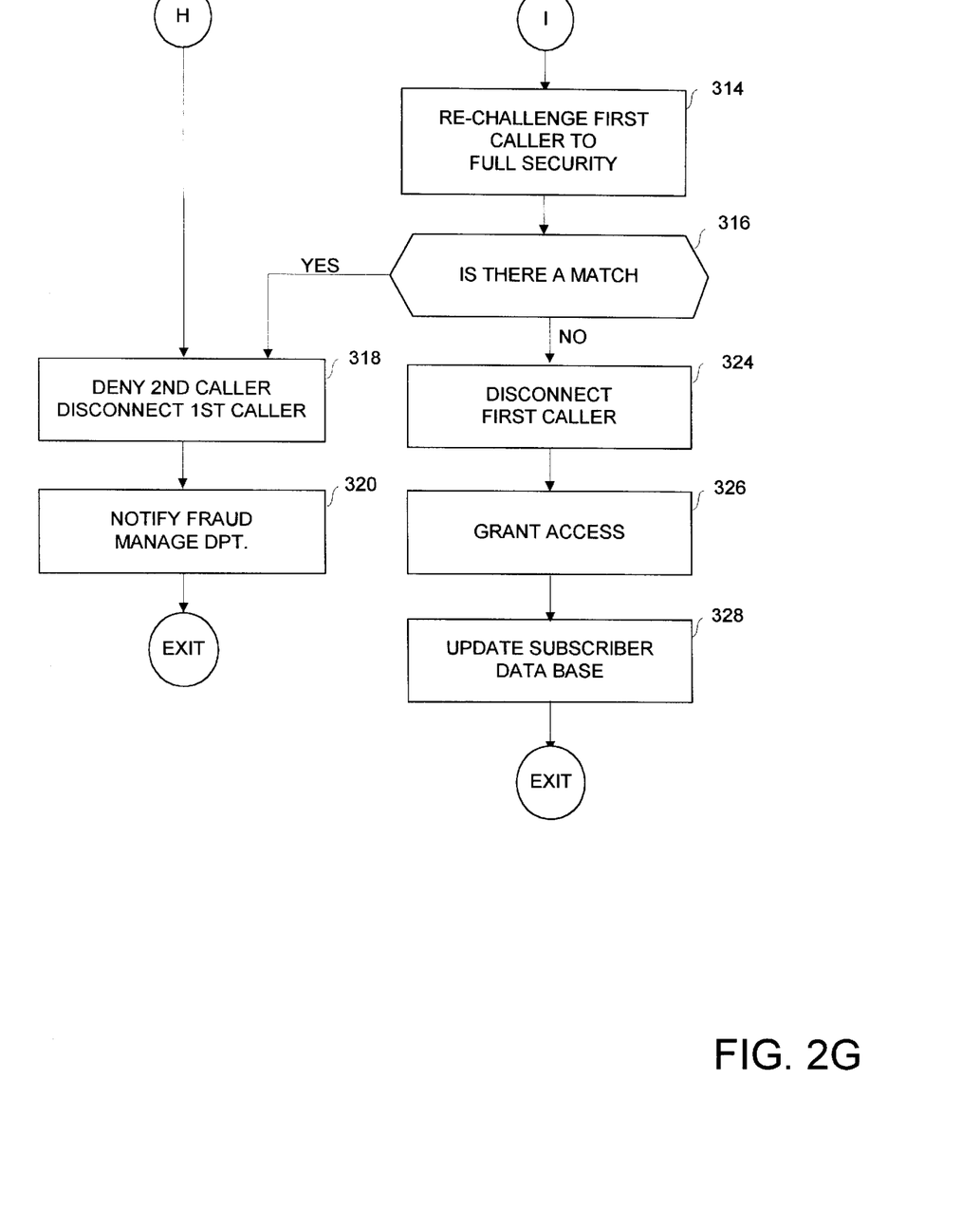

A determination at box 312 that the first caller was challenged at a maximum security level causes the present user to be denied access to the system 11, and also causes the first caller to be disconnected, at box 318 (FIG. 2G). The fraud management department for the respective provider or providers is notified of the overlapping calls at box 320 prior to the operation terminating.

If the first caller was not challenged at a maximum security level, the first caller is caused to be re-challenged at a maximum security level at box 314 (FIG. 2G). The first caller's verification information is compared with the associated stored subscriber voice authentication information at decision box 316 to ascertain if there is a match. A determination that there is a match causes the operation to proceed to box 318.

A determination that there is no match causes the first caller to be disconnected at box 324. The present user is granted access at box 326, and the subscriber information is updated at box 328 before the operation terminates.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for controlling access to a protected system by a user utilizing a calling unit to provide call information, comprising:

determining if the user is an authorized user associated with the calling unit to reduce substantially the ability of a non-authorized user to gain access to the protected system, storing subscriber information relating to said authorized user to facilitate verifying that the user is said authorized user, said subscriber information including authentication information and security level information associated with said authorized user;

detecting an indicator of potential fraudulent activity;

adjusting said security level information in response to the detection of said potential fraudulent activity indicator for indicating that a higher probability of fraudulent activity exists;

determining a given set of verification information to be input by the system user corresponding to a given level of said security level information, said given set of verification information corresponding to a certain subset of said authentication information, wherein said given set of verification information is adjusted according to the given level of said security level information for a given attempted use of the system;

requesting the system user to input said given set of verification information, wherein said certain subset of authentication information is communicated to the user for enabling the user to repeat said certain subset of authentication information;

comparing a user generated set of verification information received from the user with said certain subset of authentication information to verify that the user attempting to use the system is said authorized user, wherein access to the system by the user attempting to use the system is enabled when said user generated set of verification information corresponds substantially with said certain subset of authentication information;

determining the connection status of the calling unit at the time the user attempts to gain access;

adjusting said security level information to reflect the maximum probability that fraudulent activity is present when the connection status of said calling unit indicates that it is being used concurrently by another user to access the protected system;

requesting said another user to input another given set of verification information; and disconnecting said another user when said another user generated set of verification information does not correspond to said certain subset of authentication information.

2. A method according to claim 1, further including updating and storing the given level of said security level information for use in determining said given set of verification information to be input by the user when the calling unit is used to make a subsequent attempt to gain access to the protected system.

3. A method according to claim 2, further including storing said given level of said security level information, adjusting said given level of said security level by a predetermined increment upon the detection of said potential fraudulent activity indicator, and storing said adjusted given level of said security level information for a predetermined period of time before readjusting said adjusted given level of said security level information by said predetermined increment.

4. A method according to claim 1, wherein said step of storing subscriber information includes storing a password.

5. A method according to claim 4, wherein said step of storing subscriber information further includes storing a plurality of security phrases.

6. A method according to claim 5, further including selecting randomly at least one of said security phrases to be included in said given set of verification information to be input by the user.

7. A method according to claim 5, wherein said step of storing subscriber information further includes storing personal data information.

8. A method according to claim 1, further including selectively obtaining an ambient noise sample from the vicinity of the user, and superimposing temporarily said ambient noise sample over said certain subset of authentication information to facilitate the comparison of said user generated set of verification information with said certain subset of authentication information.

9. A method according to claim 1, further including disconnecting both the user and said another user when said user generated set of verification information and said another user generated set of verification information correspond substantially with said certain subset of authentication information.

* * * * *